United States Patent [19]
Moran

[11] 3,789,724
[45] Feb. 5, 1974

[54] FASTENER

[75] Inventor: Thomas M. Moran, Cleveland, Ohio

[73] Assignee: Eaton Corporation, Cleveland, Ohio

[22] Filed: July 12, 1972

[21] Appl. No.: 270,901

[52] U.S. Cl.................. 85/32 V, 85/80, 151/41.75
[51] Int. Cl............................................ F16b 37/00
[58] Field of Search......... 85/71, 80, 85, 86, 87, 88, 85/32 V; 151/41.75

[56] References Cited
UNITED STATES PATENTS

| 1,066,040 | 7/1913 | Osborne | 85/85 |
| 2,376,689 | 5/1945 | Granholm | 85/88 |
| 3,006,231 | 10/1961 | Kahn | 85/32 V |

FOREIGN PATENTS OR APPLICATIONS

| 408,668 | 4/1934 | Great Britain | 85/71 |
| 1,450,998 | 4/1969 | Germany | 85/80 |
| 675,579 | 11/1964 | Italy | 85/81 |
| 443,796 | 9/1967 | Switzerland | 85/85 |

Primary Examiner—Marion Parsons, Jr.
Attorney, Agent, or Firm—Teagno & Toddy

[57] ABSTRACT

A molded, internally threaded fastening device adapted for receipt of a threaded member. The fastening device is molded in a generally flat position with two preferably joined complementary sections adapted to be manually folded over upon one another, in face-to-face relationship, to form the fastener. Each complementary section defines a generally concave cavity extending along the complementary face which will cooperate with the concave cavity in the complementary face of the other complementary section to define a generally axially extending threaded member receiving bore when the two complementary sections are folded over upon one another. Each concave cavity includes molded internal thread portions on the concave surface thereof which are adapted to cooperate and register with the molded thread portions in the other cavity to form a continuous internal thread along at least a part of the threaded member receiving bore. Each complementary section also includes at least one convexly extending loop which in connection with the concave cavity defines a substantially circular aperture. When the complementary sections are folded over upon one another, or are in the preassembled position, the apertures will form a portion of the threaded member receiving bore through which the threaded member must pass.

14 Claims, 6 Drawing Figures

PATENTED FEB 5 1974 3,789,724
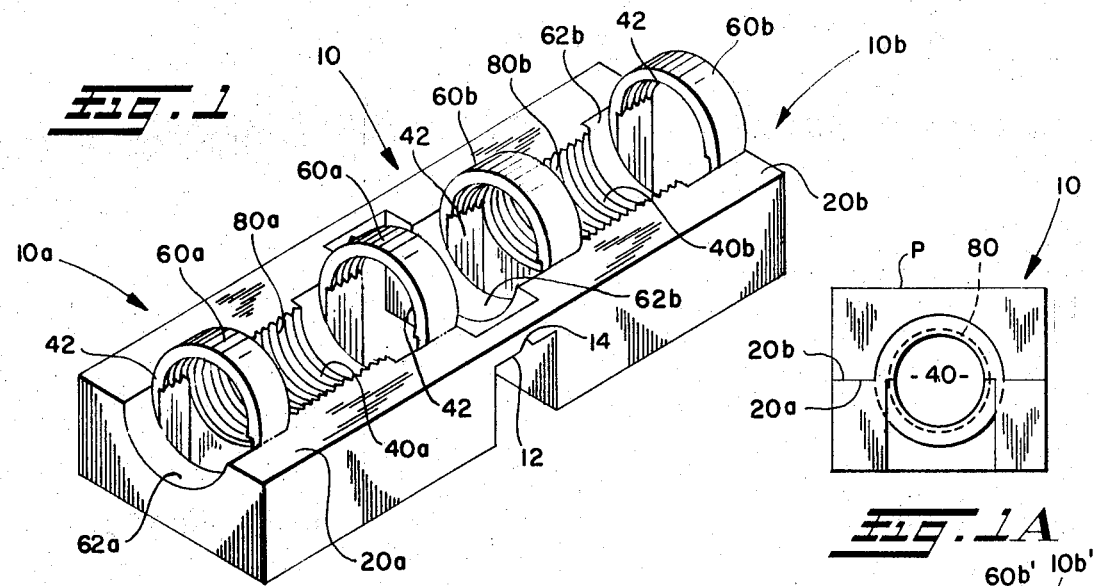
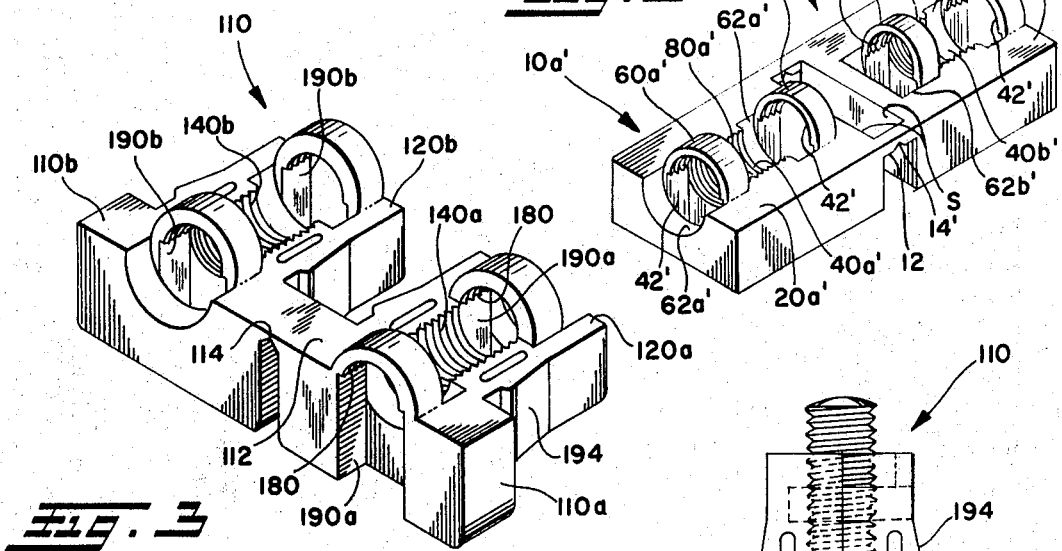
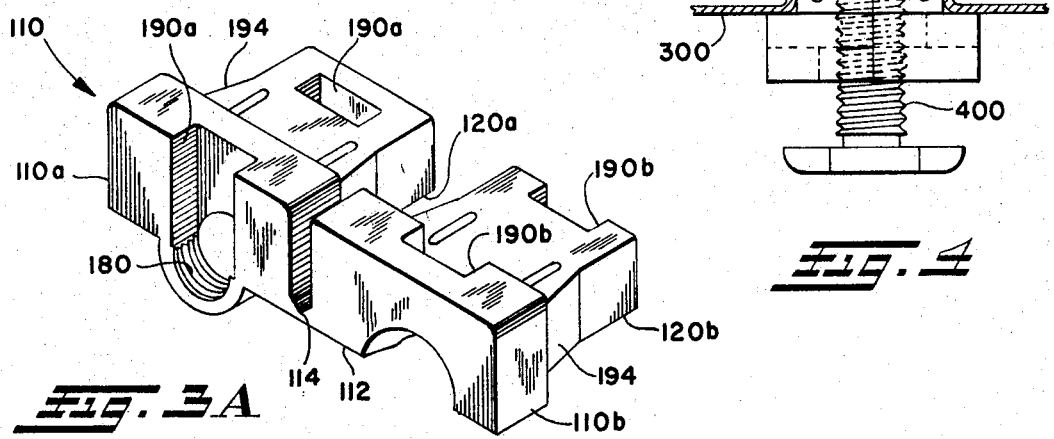

FASTENER

BACKGROUND OF THE INVENTION

1. Field of the Invention

This invention relates to threaded member receiving fasteners, and more particularly, to molded, all plastic, fold over, internally threaded, threaded member receiving fasteners.

2. Description of the Prior Art

Prior art internally threaded, threaded member receiving fasteners, whether of plastic, wood, metal or the like, required an internal tapping operation to provide internal threads for the threaded member receiving bore. Such devices were not totally satisfactory as the required internal tapping operation was a costly and complicated additional manufacturing step requiring the use of additional labor, handling equipment, tapping equipment, tooling and the like. Such additions materially added to the cost of producing such internally threaded fasteners.

Later attempts to eliminate the tapping operation involved the attempted use of fasteners, usually of molded plastic, which had an untapped threaded member receiving bore and were intended for use with self-threading fasteners, such "self-tapping fasteners" as they are known, were satisfactory for many operations. However, such self-tapping fasteners exhibited several drawbacks in that they required the use of a special, more costly, and often unavailable self-threading member. Such self-tapping fasteners also required the addition of added bulk to withstand the forces generated by the self-tapping operation.

More recently, attempts have been made to form threaded member receiving fasteners in two or more complementary sections, each section containing a concave cavity which would form a portion of an axially extending threaded member receiving bore. When fasteners were formed in this way, it was possible to mold the thread portions right into the concave cavity and eliminate the additional internal tapping operation and thus a lower cost fastener resulted. However, such fasteners prove to be less than satisfactory for certain operations as they tend to separate upon the application of tightening forces and were therefor only acceptable in those operations where the fastener was totally restrained from outward radial movements. A sample of such a fastener which is totally radially restrained by means of its operational environment may be seen by reference to applicant's copending U. S. application Ser. No. 147,571, filed May 27, 1971 and assigned to the assignee of this invention.

SUMMARY OF THE INVENTION

In accordance with the present invention, the drawbacks of the prior art have been overcome to the extent that a molded, preferably one-piece, internally threaded, fold over, economically produced, threaded-member receiving fastener has been provided which is capable of withstanding large tightening forces and is compatible with a relatively simple and economic one-step molding operation which includes the formation of internal threads. The above has been accomplished by the formation of the fastener of the present invention in two complementary sections each having a generally concave cavity extending along a complementary face and each having at least one loop extending convexly from the complementary face and being generally coaxial with the cavity. The concave cavities are each provided with molded thread portions on the concave surfaces thereof which will mate in registration with the thread portions in the other cavity to form a substantially smooth continuous internal thread in the threaded member receiving bore when the two complementary sections are manually folded upon one another. The loops, in connection with the cavities, also partially form the passage through which the threaded member must pass and thus lock the molded threads of each of the two complementary sections to the threaded member during the tightening operation of the fastener.

The formation of a molded, preferably one-piece, internally threaded fastener in two complementary fold-over sections allows the thread portions to be molded into each complementary section of the fastener rather than requiring a separate and costly internal threading operation or requiring the use of a self-threading fastener with the inherent added cost, bulk and added stress placed upon the fastener.

The fasteners of the present invention, in the folded over or preassembled condition, are quite similar to other internally threaded, threaded member receiving fasteners and may function as conventional nuts, screw receiving member, or the like.

Accordingly, it is an object of the present invention to provide a new and improved molded, threaded member receiving fastener.

A further object of the present invention is to provide an improved, one-piece, molded, internally threaded fastener having molded internal threads. These and other objects and advantages of the present invention will be apparent from the following detailed description of the invention taken in connection with the attached drawings.

BRIEF DESCRIPTION OF THE DRAWINGS

FIG. 1 is a perspective view of the fastener of the present invention;

FIG. 1a is a top view of the fastener of FIG. 1 in the folded over or preassembled position;

FIG. 2 is a modification of the fastener of FIG. 1;

FIG. 3 is a top perspective view of an alternate embodiment of the present invention;

FIG. 3a is a bottom perspective view of the alternate embodiment of FIG. 3; and

FIG. 4 is a cross sectional side view of the fastener of FIG. 3 and 3a as installed in a typical application.

DESCRIPTION OF THE PREFERRED EMBODIMENT

The molded, preferably one-piece, fold over, all plastic, internally threaded, threaded member receiving fastener 10 of the present invention may be seen in perspective view as molded by reference to FIG. 1. The fastener 10, as it is molded, comprises two complementary sections 10a and 10b which are preferably joined by webs 12. It is understood that complementary sections 10a and 10b may be separately formed.

The use of the term "plastic" to describe the present invention is not intended as a limiting term but rather is intended to cover any suitable moldable material, such as nylon or the like.

Throughout this description of the preferred embodiment, a simple numerical character will refer to a specific element of the fastener 10, such as web 12, while a numerical character with the letters *a* or *b* appended will refer to an element of the complementary sections 10*a* and 10*b* respectively.

The complementary sections 10*a* and 10*b* are substantially identical and comprise the elements discussed below. Each of the complementary sections includes a complementary face 20*a* and 20*b* intended to be folded over in a face-to-face relationship for formation of the preassembled fastener as is seen in FIG. 1*a*.

It is noted that the complementary sections 10*a* and 10*b*, are molded in a final form and thus only a simple manual folding operation is required to complete formation of the fastener 10 as seen in FIG. 1A. The fastener of the present invention is thus, in a single molding operation, produced in a form usable by the end user. The webs 12 may include notches 14 which will aid in the folding over or preassembly operation. The complementary sections each define a convex cavity, 40*a* and 40*b* extending along the complementary faces 20*a* and 20*b* respectively. The concave cavities are adapted to cooperate in registration with one another to define an axially extending threaded member receiving bore 40 when the complementary sections 10*a* and 10*b* are folded over, face 20*a*-to-face 20*b*, as may be seen in FIG. 1*a*. The outer contour, or periphery P, of the preassembled fastener 10 may, of course, be of a square, hex or any desirable configuration.

Each complementary section also has at least one loop, 60*a* and 60*b*, extending convexly from the complementary faces 20*a* and 20*b* and being substantially coaxial with the concave cavities 40*a* and 40*b*. In the preferred embodiment, as is shown in FIG. 1, each complementary section has at least one loop at each end of the concave cavities 40*a* and 40*b* which adds additional strength to the fastener 10 as will be discussed below in more detail. The loops, in connection with the cavities, each define an aperture 42 which partially defines the threaded member receiving bore 40 when the fastener is in the preassembled position. Each complementary section, 10*a* and 10*b*, also includes at least one loop receiving depression, 62*a* and 62*b*, for receipt of the loops 60*b* and 60*a* respectively. The loops 60*a* and 60*b* may loosely fit into the depressions 62*b* and 62*a* or, preferably, may be of an interference fit with the depressions which will tend to retain the fastener in the preassembled condition and will also assist in obtaining proper alignment of the complementary sections.

An alternative embodiment of the loop structure may be seen by reference to U. S. Ser. No. 259,422 filed June 5, 1972.

On the concave surface of cavities 40*a* and 40*b* are molded thread portions 80*a* and 80*b* which are adapted to mate in registration when the fastener is in the preassembled position to form a smooth continuous internal thread 80 in the threaded member receiving bore 40. The thread so formed may, of course, be of any desired type, pitch, orientation or the like.

As may be seen from FIGS. 1 and 1*a*, the apertures 42, defined by the loops 60*a* and 60*b* and the cavities 40*a* and 40*b*, partially define the threaded member receiving bore 40 through which the threaded member must pass upon threaded insertion into fastener 10. The loops will thus lock the threaded member to that complementary section from which the loop extends. Both complementary sections will thus be locked to the threaded member and consequently locked to each other to resist spreading upon the application of tightening forces. It is noted that the provision of at least two spaced loops extending from substantially opposed ends of the concave cavities provides a fold over fastener which, when in receipt of a threaded member, will strongly resist any tendency for the complementary sections to spread upon the application of a tightening force. Of course, additional loops will add additional resistance to spreading.

It will thus be apparent to those skilled in the art that an economically producable fastener which will be usable in applications wherein the fastener is subject to relatively large tightening forces and is moldable complete with internal threads in one molding operation has been provided by the present invention.

A modification 10' of the fastener in FIG. 1 may by seen by reference to FIG. 2. The modification 10' comprises two complementary fold over sections 10*a* ' and 10*b* ' which are joined by webs 12'. Each section has a complementary face 20*a* ' and 20*b* ' which defines convex cavities 40*a* ' and 40*b* ' which extend only partially along the faces. The internally threaded, threaded member receiving bore 40' thus defined by the preassembled fastener 10' will have a single opening and that surface S, opposite to the surfaces in which the bore 40 opens may be used as a leg member, a supporting member or the like as is well known in the art. The remaining structure of fastener 10' is functionally identical to that of fastener 10 described above.

An alternate embodiment of the present invention may be seen in perspective representation as molded by reference to FIGS. 3 and 3*a* and in the installed position by reference to FIG. 4. The fastener 110, as shown in FIGS. 3 and 3*a*, is molded in two complementary sections 110*a* and 110*b* joined by a web member 112. Web member 112 is notched or weakened at an intermediate point 114.

Each complementary section 110*a* and 110*b* has complementary face 120*a* and 120*b* adapted to be folded over in face-to-face relationship. Each complementary section also includes a generally concave cavity 140*a* and 140*b* and at least one convexly extending loop 160*a* and 160*b* all of which correspond functionally to the cavities 40*a* and 40*b* and loops 60*a* and 60*b* of fastener 10 described above.

Fastener 110 differs from previously described fastener 10 in that each complementary section defines a slot 190*a* and 190*b* which extends radially outward from the concave inner surface of each loop and is axially aligned in registration therewith. The slots 190*a* and 190*b* permit the molding of thread portions 180*a* ' and 180*b* ' on the concave surfaces of the loops and thus provide a longer and therefore stronger internal thread 180 in threaded member receiving bore 140.

FIG. 4 illustrates the fastener 110 as installed in an apertured panel 300 and as receiving a threaded member 400 which may be a leveling leg or the like. The fastener 110, as illustrated, also includes the additional feature of a resilient radially outwardly extending projection 194 which allows the fastener to be resiliently self-retained in an apertured panel 300 as is well known in the art.

Although this invention has been described in its preferred form with a certain degree of particularity, it is understood that the present disclosure of the preferred form has been made by way of example only and that numerous changes in the details of construction and combination and arrangement of the parts may be resorted to without departing from the spirit and the scope of the invention as hereinafter claimed.

I claim:

1. A molded, one-piece, internally threaded, threaded member receiving fastener, said fastener being molded in two joined, complementary sections each having a complementary face adapted to be manually folded over upon the other to form a preassembled fastener, each of said complementary sections comprising:

a generally concave cavity extending along the complementary face and intersecting at least one periphery of said face, said cavity adapted to register with the cavity in the other complementary section when the sections are folded face-to-face to define a threaded member receiving bore, said cavity having molded thread portions on the concave surface thereof which will register with the molded thread portions in the other concave cavity to form a substantially smooth internal thread in the threaded member receiving bore, and at least one loop extending convexly from said face, said loop being substantially coaxial with said cavity and partially defining said threaded member receiving bore.

2. The fastener of claim 1 wherein each of said complementary sections additionally comprises loop receiving depressions to receive the loops convexly extending from the other complementary face.

3. The fastener of claim 2 wherein said loop receiving depressions receive said loops in a resilient interference fit.

4. The fastener of claim 1 wherein each of said sections includes at least two convexly extending loops and at least two loop receiving depressions, two of said loops being substantially adjacent the opposite extremities of said concave cavity.

5. The fastener of claim 1 wherein each complementary section defines a slot opening outwardly of said section opposite each loop, said slots allowing access to the concave surface of said loops.

6. The fastener of claim 5 wherein the concave surface of said loops includes molded thread portions thereon, said molded thread portions adapted to register with the molded thread portions on the concave surfaces of said concave cavities to define a substantially continuous internal thread.

7. The fastener of claim 1 wherein said cavity is substantially straight and intersects said face periphery twice, said threaded member receiving bore being a through bore.

8. The fastener of claim 1 wherein said cavity intersects said periphery at only one place to define a closed end fastener.

9. The fastener of claim 1 wherein said complementary sections are joined by easily deformed webs.

10. The fastener of claim 9 wherein said webs are weakened at a preselected intermediate point to assure proper registration of said complementary sections upon being folded upon the other.

11. A molded, internally threaded, threaded member receiving fastener, said fastener comprising two complementary sections each having a complementary face adapted to be placed upon the other to form a preassembled fastener, each of said complementary sections comprising:

a generally concave cavity extending along the complementary face and intersecting at least one periphery of said face, said cavity adapted to register with the cavity in the other complementary section when the sections are placed face-to-face to define a threaded member receiving bore, said cavity having molded thread portions on the concave surface thereof which will register with the molded thread portions in the other concave cavity to form a substantially smooth internal thread in the threaded member receiving bore, and at least one loop extending convexly from said face, said loop being substantially coaxial with said cavity and partially defining said threaded member receiving bore.

12. The fastener of claim 11 wherein said complementary sections are joined by at least one deformable web member.

13. A molded, one-piece, internally threaded, threaded member receiving fastener, said fastener being molded in two joined, complementary sections each having a complementary face adapted to be folded over upon the other to form a preassembled fastener, each of said complementary sections comprising:

a generally concave cavity extending along the complementary face and intersecting at least one periphery of said face, said cavity adapted to register with the cavity in the other complementary section when the sections are folded face-to-face to define a threaded member receiving bore, said cavity having molded thread portions on the concave surface thereof which will register with the molded thread portions in the other concave cavity to form a substantially smooth internal thread in the threaded member receiving bore, and at least one loop extending convexly from said face, said loop being substantially coaxial with said cavity and defining an aperture in connection therewith, said apertures partially defining said threaded member receiving bore.

14. The fastener of claim 13 wherein each of said complementary sections additionally comprises a loop receiving depression to receive the loops extending from the other complementary face.

* * * * *